2 Sheets. Sheet 1.

J. P. Manny,
Mower.

No. 3524.

Reissued June 29. 1869.

Witnesses
Joe. Peyton.
Battis De Long.

J. P. Manny
by his Atty
Wm. D. Baldwin

2. Sheets. Sheet. 2.

J. P. Manny,
Mower.

No. 3524. Reissued. June. 29. 1869

J. P. Manny
by his atty
Wm. D. Baldwin

Witnesses { Geo. Peyton.
Baltis De Long

UNITED STATES PATENT OFFICE.

JOHN P. MANNY, OF ROCKFORD, ILLINOIS.

IMPROVEMENT IN HARVESTERS.

Specification forming part of Letters Patent No. 17,779, dated July 14, 1857; reissue No. 3,524, dated June 29, 1869.

DIVISION A.

*To all whom it may concern:*

Be it known that I, JOHN P. MANNY, of Rockford, in the county of Winnebago and State of Illinois, have invented certain new and useful Improvements in Harvesters, of which the following is a full, clear, and exact description:

The first branch of my invention relates to the use of the machine as a mower; and the improvement consists, first, of the combination, substantially as hereinafter set forth, in a rear-cut harvester, of two main wheels; a frame, vibrating about the main axle; a tongue, hinged within the periphery of the wheels; and a laterally-projecting finger-beam, vibrating with the frame; second, of the combination, substantially as hereinafter set forth, in a rear-cut harvester, of two main wheels; a frame arranged between said wheels, and vibrating about the main axle; a finger-beam, projecting laterally from said frame; and a tongue hinged to said frame near the axle; third, of the combination, substantially as hereinafter set forth, of two main wheels; a vibrating frame, ararranged between the wheels, and projecting beyond their periphery at the rear end only; a laterally-projecting finger-beam, secured to the rear of said frame; and a tongue hinged to the forward end of said frame near the axle.

Figure 1:
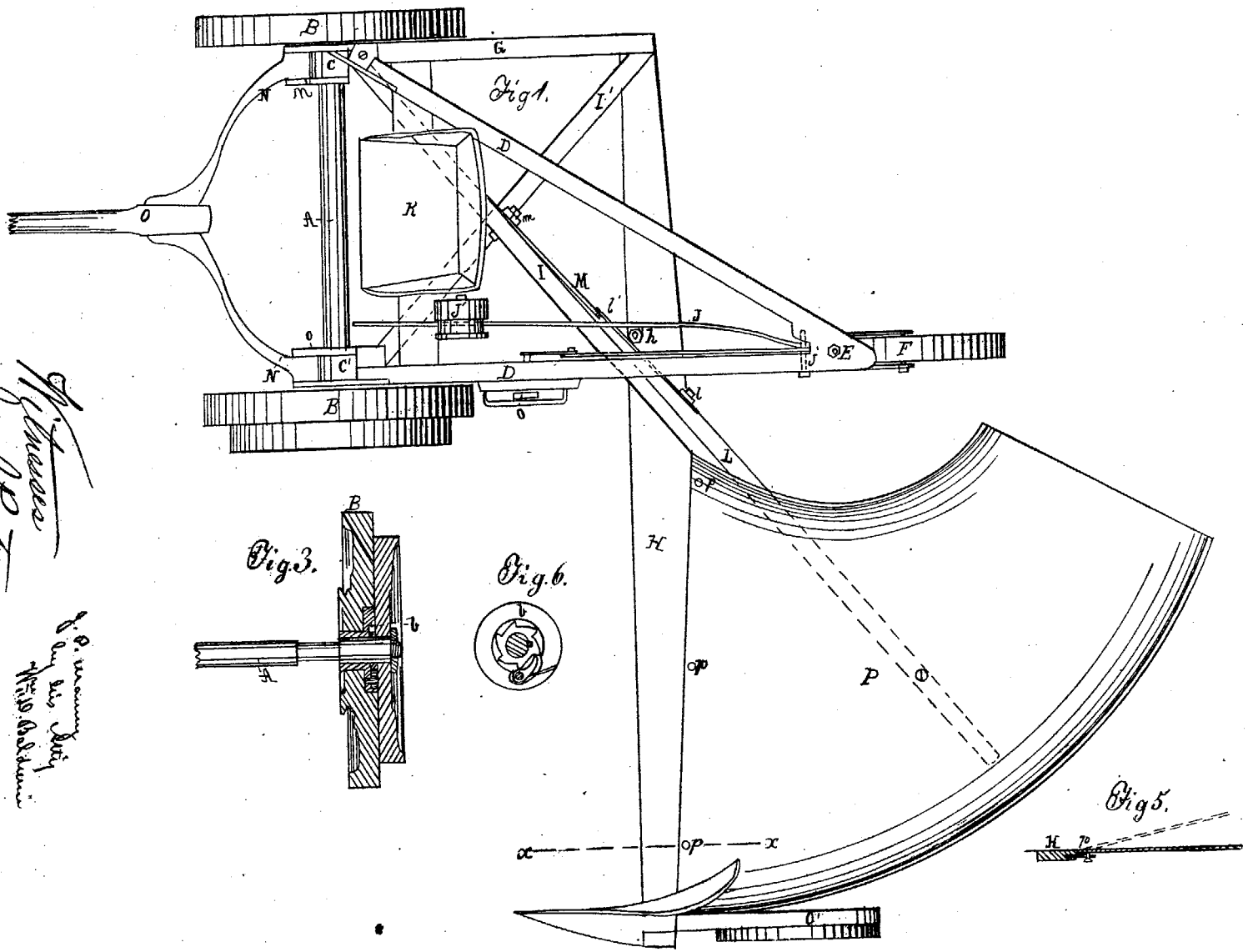
Figure 2:
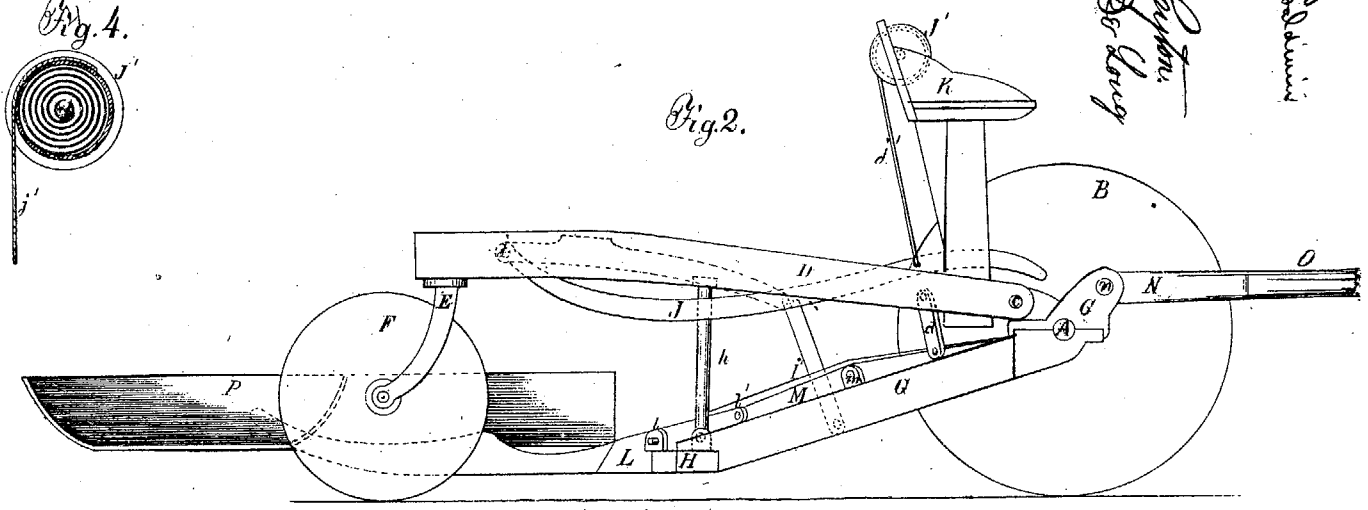
Figure 4:
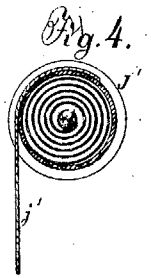

In the accompanying drawings, which make part of this specification, Figure 1 represents a plan or top view of my improved machine; Fig. 2, a view, in elevation, of the same, as seen from the stubble side, with the outer wheel removed; Fig. 3, a vertical transverse section, through one of the driving-wheels; Fig. 4, a vertical section through a spring-drum, which is used for taking up a portion of the weight of the finger-beam, to prevent it from dragging too heavily on the ground; Fig. 5, a vertical section through the finger-beam and platform, at the line *x x* of Fig. 1; and Fig. 6, a section showing one of the backing-ratchets.

An axle, A, supported on wheels B B′, turns freely in boxes or bearings C C′, to each of which one end of a piece, D D′, is respectively secured. The wheels likewise turn loosely on the axle, with which they are connected by suitable backing-ratchets *b*, Fig. 6. The pieces D D′ unite at their rear ends, and are supported by a caster-wheel, F, turning freely on its pivot or spindle E. Side-pieces G G′ are connected to the lower rear parts of the boxes C C′ in front, and are attached in rear to a finger-beam, H, projecting laterally beyond the wheels and frame. Diagonal braces I I′ pass from corner to corner of the quadrangular frame formed by the main axle, the projecting extension of the finger-beam, and the side pieces G G′, and brace these parts firmly, while allowing them to vibrate, or be adjusted around the axle A, as hereinafter described. A lever, J, is pivoted, at *j*, to the frame-piece D′, and extends to a point near the conductor's seat K, likewise mounted on the frame D D′, so that the driver can readily operate the lever, to raise or lower the finger-beam, which is suspended from the lever by a rod, *h*, which passes loosely through an eye in the lever, to allow the finger-beam to play vertically, without moving the lever. The tongue O is connected to hounds N, hinged to the boxes C C′, at *n*.

When these machines are used for mowing, the finger-beam is lowered, so as to move over but in contact with the ground, in order to cut close, but the friction produced by the dragging of the finger-beam is detrimental, by increasing the draft. This difficulty I obviate by mounting a spring-drum, J′, on a standard, supported on the frame D D′, and connecting it by a cord or chain, *j′*, with the lifting-lever J, from which the finger-beam is suspended. One end of a coiled spring is fastened to the axis, and the other to the periphery of the drum, which is also provided with a ratchet and pawl, so that the spring may be wound up to and held at any desired degree of tension. The tension of the spring regulates the lifting-power applied to the lever J, and thus relieves the pressure of the finger-beam upon the ground, while allowing the crop to be closely cut.

For reaping, I attach a platform, P, to the finger-beam, by hinges *p*, Fig. 5. But in raising or lowering this platform I desire it always to retain the same horizontal position, or, in other words, to be raised and lowered in parallel lines, front and rear, which it would not do with the devices above described alone. To effect this object, therefore, I use a long lever or supporting-beam, L, which extends far under the platform, (as shown in dotted lines in Fig. 1,) and its outer end is fastened to the platform. This beam L is hinged to the finger-beam at *l*, and its front end is pivoted at *l'* to one end of a lever, M, which has its fulcrum at *m*, on the diagonal brace I, while its front end is connected by a link, *d*, with the frame D D'. The result of this arrangement is, that the supporting-piece L depresses the rear end of the platform, as the finger-beam is raised by the lever J, and vice versa, the connections between the frame D D' and the supporting-piece L forming a compound lever to effect this purpose, and thus both the front and rear of the platform are kept in a horizontal position while they are raised or lowered to any desired cutting height. The reel-arms or standards O O' are, respectively, mounted on and vibrate with the divider and the frame G G'.

The operation of the machine will readily be understood from the foregoing description. The team is harnessed to the tongue in the usual well-known way. The tongue being pivoted to the boxes, near the main axle, is free to vibrate up and down around said pivots without affecting the movements of the other parts of the machine. The frame D D' is in like manner pivoted to the boxes near the axle, and is also free to vibrate up and down around said pivots. The frame G G' is likewise connected with the boxes in which the main axle turns, and is free to vibrate up and down around said axle, to allow the finger-beam to conform to the undulations of the ground over which it slides when mowing. As the frame G is suspended by a link, *h*, from the lever J on the frame D, the driver can raise or lower the finger-beam at pleasure or hold it at any desired elevation. When reaping, he can in like manner raise and lower the platform, at the same time keeping it horizontal, by means of the lever M, and its linked connections with the frame D D'.

As the driver's seat is mounted on the frame D D', the finger-beam and tongue (either or both) can vibrate up and down without rocking the seat back and forth on the axle.

What I claim as my invention, and desire to secure by Letters Patent, is—

1. The combination, substantially as set forth, in a rear-cut harvester, of two main wheels, a frame vibrating about the main axle, a tongue hinged within the periphery of the wheels, and a laterally-projecting finger-beam vibrating with the frame.

2. The combination, substantially as set forth, in a rear-cut harvester, of two main wheels, a frame arranged between said wheels, and vibrating about the main axle, a finger-beam projecting laterally from said frame, and a tongue hinged to said frame near the axle.

3. The combination, substantially as set forth, of two main wheels, a vibrating frame arranged between the wheels and projecting beyond their periphery at the rear end only, a laterally-projecting finger-beam secured to the rear of said frame, and a tongue hinged to the forward end of said frame near the axle.

JOHN P. MANNY.

Witnesses:
THOMAS W. COLE,
SILAS G. TYLER.